United States Patent [19]

McLaren

[11] 4,176,283
[45] Nov. 27, 1979

[54] WATER POWERED GENERATOR

[76] Inventor: Richard H. McLaren, 7280 Cloverblossom La. NE., Bremerton, Wash. 98310

[21] Appl. No.: 854,388

[22] Filed: Nov. 23, 1977

[51] Int. Cl.$^2$ .............................................. F01D 15/10
[52] U.S. Cl. ...................................... 290/52; 415/91; 416/132 A; 416/177
[58] Field of Search ................. 415/122, 91; 416/219, 416/240, 177, 132 A; 290/52

[56] References Cited

U.S. PATENT DOCUMENTS

| | | | |
|---|---|---|---|
| 1,793,468 | 2/1931 | Densmore | 416/219 |
| 2,949,540 | 8/1960 | Clayton | 290/52 |
| 3,804,553 | 4/1974 | Hickey | 415/122 |

Primary Examiner—Gene Z. Rubinson
Assistant Examiner—John W. Redman
Attorney, Agent, or Firm—Shlesinger, Fitzsimmons & Shlesinger

[57] ABSTRACT

In the illustrated embodiment a hollow armature core is rotatably mounted in a water main, and is caused to rotate by water pressure applied against flexible sensing vanes, which are affixed in an axial bore in the armature core. Rotational speed of the armature is determined by the flow rate or pressure of the water in the main, fluctuations in such pressure causing corresponding flexure and angular variation in the vanes, thereby to effect rotation of the armature at a constant speed. The generating unit incorporating the unique rotor becomes an integral part of the existing closed water conveyance system.

3 Claims, 4 Drawing Figures

U.S. Patent    Nov. 27, 1979    4,176,283
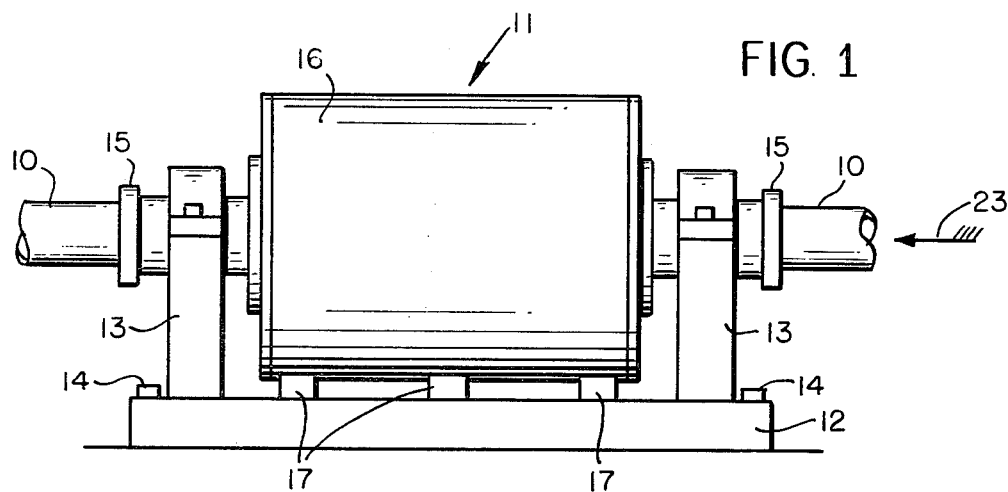
FIG. 1
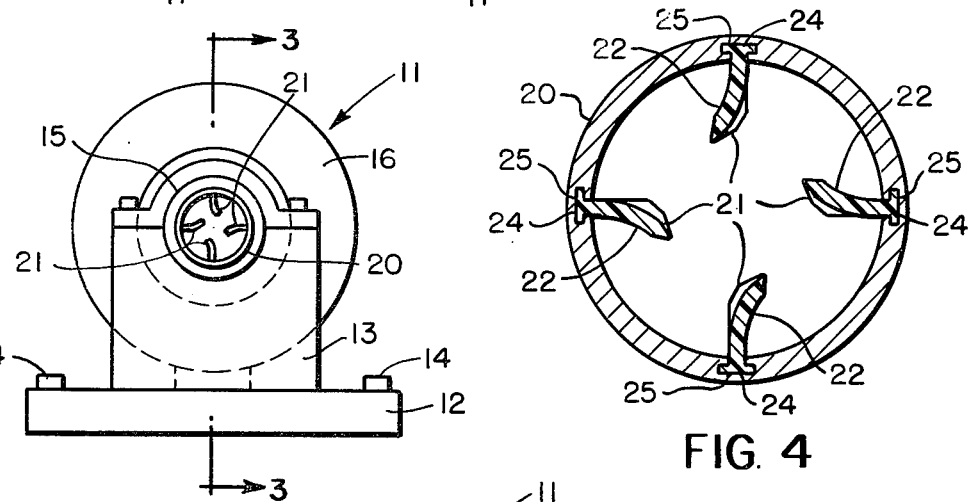
FIG. 2
FIG. 4
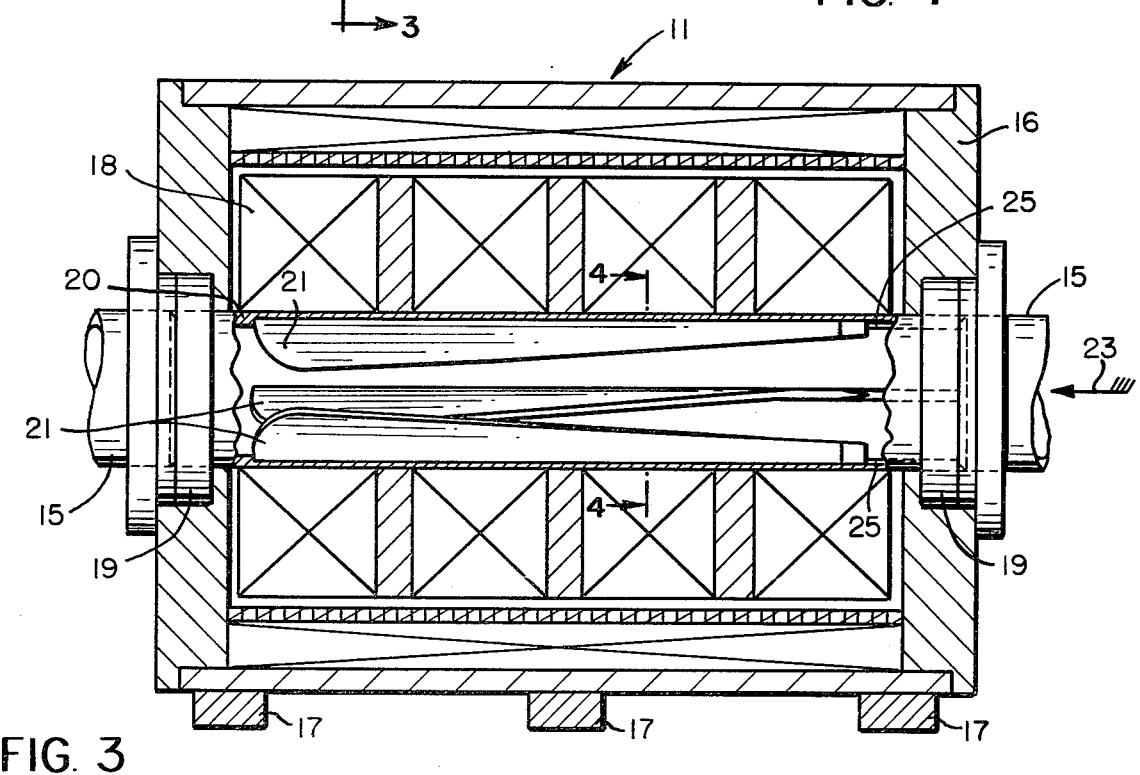
FIG. 3

WATER POWERED GENERATOR

This invention relates to the production of electrical energy, and more particularly to a novel method for utilizing existing hydro-electric potential. Even more importantly this invention provides a relatively simple method and means for utilizing a heretofore wasted energy source.

It is conventional for communities to distribute water via gravity or pump pressure supply systems. Water usage therefrom creates an energy source heretofore dissipated. To utilize such a potential is a prime object of this invention. It is an object also to conserve energy in view of its general depletion.

Another object of this invention is to provide a locally augmentive electric power supply, which will compliment regional electric power supply systems, and will supplement peak-load demands and will counter area blackouts.

Still another object of this novel device is to provide such energy utilization by a conservative integration of existing water-electric distribution systems.

A further object of this invention is to provide a generator unit having a novel in-line armature or rotor which is adapted to be mounted in a water main to be variably respondent to in-line water pressure, thus providing a constant kilovolt peak output of the unit.

Still another object of this invention is to utilize existing water mains to provide electrical energy without significantly reducing water main pressures necessary for usual water distribution.

Another object of this invention is to provide a compact, generally applicable, and easily installed generating device of the type described.

Other objects of the invention will be apparent from the specification and from the recital of the appended claims, particularly when read in conjunction with the accompanying drawing.

In the drawing:

FIG. 1 is a fragmentary side elevational view of a water main, having incorporated therein a generator made according to one embodiment of this invention;

FIG. 2 is a fragmentary end elevational view of this assembly;

FIG. 3 is an enlarged fragmentary sectional view taken along line 3—3 of FIG. 2 looking in the direction of the arrows, but with portions of the assembly shown in full; and FIG. 4 is a still further enlarged fragmentary sectional view taken along the line 4—4 of FIG. 3, and illustrating in section the tubular armature core and the flexible vanes which are used to impart rotation to the core.

Referring now to the drawing by numerals of reference, 10 denotes generally part of a large water main or pipe located at a distribution point for a municipal water supply or the like. Mounted on the floor at this location is a novel generating device 11, which is supported on a stationary base 12 by a pair of rigid, vertical cradles 13. The base 12 and cradles 13 may be made of steel; and the base 12 is fastened to the floor by bolts 14. The size of the generator 11 is determined by the flow-pressure or rate constants of the water flowing in the pipe 10; and the pipe itself may vary in size from a few inches to several feet in diameter. Cradles 13 are so constructed so as to accomodate the specific pipe size and associated fittings.

The satellite generating unit 11 comprises a stator 16 and an armature 18, which are of appropriate capacity. The armature 18 is incorporated into the main 10 by utilizing water-tight sleeve couplings 15, as noted in greater detail hereinafter.

The stator 16, which includes conventional stator windings, may be of the AC, DC, or alternator variety, and is supported by stationary base attachments 17. The stator is free of connections to the armature 18, which rotates within the bore of the stator. The armature windings are mounted on a tubular core 20, opposite ends of which are mounted to rotate in bearings 19 carried in the stator end plates.

Water passing through the hollow armature core 20 in the direction indicated by arrow 23 impinges upon a plurality of sensing vanes or fins 21, which project at 90° intervals radially inwardly from the bore wall of core 20, thereby causing rotation of the armature 18. The vanes 21 have integral, transverse bases 24 (FIG. 4) which are seated removably in generally T-shaped, longitudinally extending slots 25 formed in the bore wall of core 20. The vanes 21 are molded of resilient polyethylene, and intermediate their ends have inclined, propeller-like surfaces 22 (FIG. 4), so that within comparatively wide limits of water flow-pressure variations in pipe 10 they will flex or bend to provide constant torque and thus constant RPM of the armature 18.

For replacement of worn vanes, or vanes of different pitch along their surfaces 22, the coupling 15 at the right end of the device 11 may be removed, and the base 24 of each vane 21 can then be removed by sliding it toward the water inlet end (the right end) of the core 20 and out of the associated T-shaped slot or groove 25.

The vanes 21 will display greatest pitch when water pressure is least, and vise versa at high pressures. However, they always maintain minimal, intermediate, or maximum pitches, and thus resistance, thus to afford steady armature rotation. Pitch and size of the vanes 21 is dependant upon the size of core 20 and the armature RPM requirements, and can be readily fashioned by one skilled in the art.

The electrical energy so produced by the satellite generator 11 can be distributed locally in the existing supply lines after appropriate conventional voltage regulation.

From the foregoing it will be apparent that applicant has devised a relatively simple and generally applicable device for providing electricity from a readily available source heretofore uptapped. By using this novel device power will become available from countless water sources to multiply the total electric energy output in an area. Moreover, the present energy crisis compells one to utilize all available potentials.

While in the embodiment illustrated it has been suggested that polyethylene vanes be employed, it will be readily apparent to one skilled in the art that the particular manner in which the vanes are constructed, or the number thereof, is merely a matter of choice and may be fashioned of any appropriate material or design, provided however that the exposed edges thereof are tapered, as shown for example in FIGS. 3 and 4, or otherwise designed to provide minimal resistance to water flow in the main 10. Each vane, moreover, is designed never to be completely without minimal pitch, and for this purpose, if desired, they could be curved slightly along their entire lengths, in which case their respective bases 24 and the T-slots 25 in core 20 would also have to be curved slightly intermediate their ends.

It will be understood also, that the exact type of bearings 19 and couplings 15 which are employed may be a matter of choice to one skilled in the art, the purpose being to support the core 20 for coaxial rotation relative to the main 10 without any undesirable leakage of water from the main 10, and also to allow removal and replacement of vanes 20, when necessary.

While this invention has been illustrated and described in connection with only certain embodiments thereof, it will be apparent that it is capable of still further modification, and that this application is intended to cover any such modifications which fall within the scope of one skilled in the art or the appended claims.

Having thus described my invention, what I claim is:

1. An electric generating device, comprising, a stator, an armature rotatable in a central opening in said stator and having therethrough an axial bore, means rotatably mounting said armature in a water main coaxially thereof and drive means mounted in the bore of said armature and responsive to the flow of water therethrough to impart rotation to said armature at a substantially constant rate, said drive means comprising a plurality of resilient vanes projecting radially inwardly into the bore in said armature to cause said rotation of the latter when water flows through said bore, and each of said vanes being disposed to flex slightly in response to variations in the water pressure in said main thereby to allow said rotation of the armature to be substantially constant.

2. A device as defined in claim 1, including means for removably mounting each of said vanes in said bore wall for ready replacement, comprising an integral, longitudinally extending base section formed on each of said vanes, said base sections being slidable into and out of longitudinally extending slots in said bore wall.

3. A method of generating electricity at substantially constant rate, comprising mounting a section of a water main for rotation coaxially of the axis of the main, and within the bore of a stator coil, providing an armature coil on said section for rotation therewith in the bore of said stator coil, providing a plurality of flexible vanes in the bore of said section of said main to impart rotation to said section, and causing water to flow axially through said rotatable section of said main to impart to said armature coil rotation sufficient to generate a substantially constant kilovolt output and, a substantially constant RPM regardless of minor changes in the rate of flow of water through said bore solely as a result of said flexible vanes.

* * * * *